United States Patent Office 3,393,217
Patented July 16, 1968

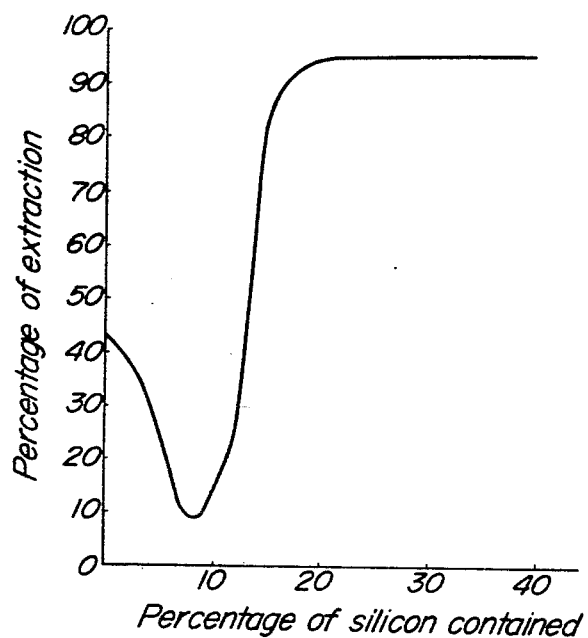

3,393,217
METHOD FOR PRODUCING ALKYLALUMINUM COMPOUNDS
Eiichi Ichiki, Hirosuke Ryu, and Atsuro Matsui, Niihama-shi, Japan, assignors to Sumitomo Chemical Company, Ltd., Osaka, Japan, a corporation of Japan
Filed Aug. 26, 1964, Ser. No. 392,160
Claims priority, application Japan, Aug. 30, 1963, 38/46,171
8 Claims. (Cl. 260—448)

ABSTRACT OF THE DISCLOSURE

A method for producing alkylaluminum compounds which comprises reacting (1) aluminum, (2) a catalytic substance selected from the group consisting of trialkylaluminum, dialkylaluminum hydride and dialkylaluminum halide and (3) hydrogen with or without an olefin, characterized by using aluminum-silicon alloys as the source of aluminum to carry out the reaction effectively at an increased rate.

---

This invention relates to a method for producing a dialkylaluminum hydride, trialkylaluminum or a mixture thereof (hereinafter referred to as "alkylaluminum compounds") by reacting an aluminum-silicon binary alloy with a catalytic substance and hydrogen, or further with an olefin.

The term "catalytic substance" as used herein means a substance which acts as a seed of multiplication of an alkylaluminum compound or as a catalyst, in the synthesis of an alkylaluminum compound from aluminum, olefin and hydrogen. Such substance includes trialkylaluminum and dialkylaluminum halides.

It is well known that the alkylaluminum compounds are produced by reacting aluminum with an olefin and hydrogen, in one stage in the presence of a trialkylaluminum or a dialkylaluminum halide (refer for example to Japanese patent publication No. 5,710/57, and Ann. der Chem., vol. 629, 1, 1960) and that it is carried out by reacting, in a first stage, aluminum with trialkylaluminum and hydrogen to form a dialkylaluminum hydride, and then reacting, if necessary, in a second stage the dialkylaluminum hydride with an olefin to produce trialkylaluminum (refer for example to Japanese patent publication No. 927/58).

These processes have many advantages but suffer, on the other hand, from such drawback that they are relatively slow in the reaction velocity. In order to improve the reaction velocity, the elevation of reaction temperature or hydrogen pressure may be considered, however, the elevation of reaction temperature or hydrogen pressure is undesirable because of the fact that the alkylaluminum is thermally decomposed or the reaction apparatus should necessarily be made complex. Further, the use of starting aluminum fine in grain size may also be a means for improving the reaction velocity, but the pulverization of aluminum is relatively difficult and, particularly, a commercial scale pulverization results in such drawback that the production cost is made higher.

As the result of various studies to overcome the above-mentioned drawbacks of conventional processes, the present inventors have discovered that the reaction velocity is markedly improved by using as the starting aluminum a binary alloy comprising ordinary aluminum and silicon, instead of finely dividing the aluminum. For example, grains of 99.8% purity aluminum in grain size of 16–20 mesh and grains of various aluminum-silicon alloys were respectively activated according to the known procedure and were reacted respectively with 1.5 times the theoretical amount of triisobutylaluminum at a reaction temperature of 120° C. under a hydrogen pressure of 100 kg./cm.$^2$, for 15 hours to know the relation between the silicon content of each alloy and the conversion of aluminum as shown in FIG. 1.

The term "conversion of aluminum" means the percentage of the amount of aluminum consumed to the amount of aluminum or total aluminum in the aluminum-silicon alloy charged.

As is apparent from the FIG. 1, the conversion under the above conditions is lowest at the silicon content of 8%, and rapidly increases when the silicon content becomes more than 15%, and, when the silicon content is more than 20%, it is possible to convert aluminum to alkylaluminum compounds substantially quantitatively.

One object of the present invention is to provide a method for producing alkylaluminum compounds with high reaction rate by using a binary alloy comprising ordinary aluminum and silicon.

Another object is to provide a method for producing alkylaluminum compounds, with easy crushing procedure of the aluminum material, by using high brittle aluminum-silicon binary alloy.

Further objects will be apparent from the following description.

To accomplish these objects, this invention provides a method for producing alkylaluminum compounds which comprises reacting a binary alloy comprising aluminum and silicon with a catalytic substance and hydrogen gas, or further with an olefin.

According to the process of the present invention, the binary alloy comprising aluminum and silicon may contain an impurity amount of iron, copper, titanium and magnesium.

The amount of silicon to be contained in the aluminum-silicon binary alloy is more than 13% by weight, preferably more than 15% by weight, though it may be varied depending on reaction conditions. However, in case the amount of silicon is too excessive, the amount to be treated in the reaction and in other operations becomes larger to result in economical disadvantage. Therefore, the amount of silicon is desirably less than 60%.

The above-mentioned aluminum-silicon binary alloys have a tendency to be finely divided during the reaction due to intercrystalline corrosion. It is considered that the above tendency might probably improve markedly the reaction velocity. Particularly, alloys containing more than 15% of silicon are finely divided from the initial stage of the reaction and are completely pulverized during the reaction. In accordance with the present invention, therefore, the aluminum-silicon alloys are not required to be finely divided but may be used in any shapes such as chip-like fragments obtained by use of a shaper, lathe or drilling machine, or block-like piece obtained by simple crushing or cutting.

It is another advantage of the present invention that the aluminum-silicon binary alloys are high in brittleness as compared with aluminum alone and hence may be crushed or ground with marked ease.

Namely, in the present invention, the aluminum-silicon binary alloys are not necessarily finely divided and those in the form of blocks may also be used. In continuous operations on commercial scale, however, it is convenient in most cases that the alloys, regardless of whether they are to be charged alone or in the form of a slurry, have been crushed or ground to a certain extent into the form of small fragments, before charging the alloys continuously into reactors. Therefore, the easiness of the alloys in crushing or grinding is markedly advantageous in commercial scale production.

The aluminum-silicon binary alloys should be activated for use in the reaction, like in the case of aluminum, and the activation may be carried out according to any of the known processes proposed in the case of aluminum which are effected by crushing or cutting the alloy in a hydrocarbon solvent containing a small amount of an organoaluminum compound, by jetting the alloy in a molten state into a protective liquid in an inert atmosphere, or by using an activator such as a trialkylaluminum, dialkylaluminum halide or the like.

As the trialkylaluminum and dialkylaluminum halides to be used in the present invention as the catalytic substances, those having alkyl groups of 2–20 carbon atoms and such as ethyl, propyl, n-butyl, isobutyl, 2-methyl-1-pentyl, and 2-ethyl-1-hexyl, are advantageously employed. Further, the olefin to be used as a starting material includes those having 2–20 carbon atoms, such as ethylene, propylene, n-butylene, isobutylene, 2-methyl-1-pentene, and 2-ethyl-1-hexene.

In accordance with the method of the present invention, in case trialkylaluminum is used as the catalytic substance, it is not necessarily added in the form of trialkylaluminum but may be formed in the reaction system from a dialkylaluminum hydride and a corresponding olefin.

The reaction temperatures to be adopted in the production of alkylaluminum compounds from the aluminum-silicon binary alloys and other starting materials are in the range of from 50° C. to 200° C., preferably from 100° C. to 150° C.

At temperatures below 50° C., the reaction velocity is markedly low and hence the adoption of said temperatures is disadvantageous from the industrial point of view. Further, the temperatures of above 200° C. are not suitable because alkylaluminum compounds are decomposed at said temperatures.

Suitable reaction pressures are in the range of from 10 to 300 kg./cm.$^2$. Under pressures of less than 10 kg./cm.$^2$, the reaction velocity is low, whereas under pressures of more than 300 kg./cm.$^2$, the reaction apparatus should necessarily be made complex and is not practical.

In accordance with the method of the present invention, a metal residue containing a large amount of silicon, which has been used in the production of alkylaluminum, is separated from other reaction mixture, formed into an aluminum-silicon alloy of a suitable proportion and may be used again. In this case, the metal residue may be recycled in the form of silicon by completely covering aluminum present in the alloy into an alkylaluminum compound, or may be recycled in the form of an alloy or mixture comprising aluminum and silicon by converting only a part of aluminum present in the alloy.

The following examples are given in order to illustrate the present invention but not to limit it.

Example 1

Into an autoclave which was filled with hydrogen gas, 386 g. of small grains of an activated aluminum-silicon alloy of 16–20 mesh containing 30.0% of silicon, and 5.940 g. of triisobutylaluminum were charged. The content of the autoclave was heated, while stirring, to 120° C. Then, hydrogen gas was introduced into the autoclave until the pressure became 100 kg./cm.$^2$, and the reaction was carried out for 15 hours. During the reaction, the perssure of the reaction system was maintained at 100 kg./cm.$^2$ by supplying hydrogen gas as the pressure of the reaction system lowered.

After the reaction, the autoclave was cooled to room temperature and the gas was discharged to reduce the pressure in the autoclave to atmospheric. Thereafter, the content was withdrawn to recover 127 g. of a metal residue together with triisobutylaluminum and a diisobutylaluminum hydride. The conversion of aluminum based on the weight of the consumed aluminum was 96.0%.

The same procedures as above were repeated, using in place of the aluminum-silicon alloy 270 g. of small grains of 99.8% purity aluminum of 16–20 mesh. In this case, the conversion of aluminum based on the consumed amount of aluminum was 43.2%.

Example 2

Into an autoclave which was filled with hydrogen gas, 339 g. of small grains of an activated aluminum-silicon alloy of 16–20 mesh containing 20.3% of silicon, 280 g. of a diisobutylaluminum hydride and 864 g. of isobutylene were charged. The content of the autoclave was heated, while stirring, to 120° C. Subsequently, hydrogen gas was introduced under pressure into the autoclave until the pressure became 100 kg./cm.$^2$ and the reaction was carried out for 15 hours.

During the reaction, the pressure of the reaction system was maintained at 100 kg./cm.2 by supplying hydrogen gas as the pressure of the reaction system lowered. After the reaction, the content of the autoclave was cooled to room temperature and the gas was discharged to reduce the pressure in the autoclave to atmospheric. Thereafter, the content of the autoclave was withdrawn to recover 224 g. of a metal residue together with a diisobutylaluminum hydride. The conversion of aluminum based on the consumed amount of aluminum was 68.0%.

The same procedure as above was repeated, using in place of the aluminum-silicon alloy 270 g. of small grains of 99.8% purity aluminum of 16–20 mesh. In this case, the conversion of aluminum based on the consumed amount of aluminum was 40.2%.

Example 3

Into an autoclave which was filled with hydrogen gas, 450 g. of medium grains of an activated aluminum-silicon alloy of 5–6 mesh containing 40.0% of silicon, and 5,940 g. of triisobutylaluminum were charged. The content of the autoclave was heated, while stirring, to 150° C. Subsequently, hydrogen gas was introduced under pressure into the autoclave until the pressure became 100 kg./cm.$^2$, and the reaction was carried out for 15 hours. During the reaction, the pressure of the reaction system was maintained at 100 kg./cm.$^2$ by supplying hydrogen gas as the pressure of the reaction system lowered. In this case, the reaction product, which was liquid, was obtained as a mixture comprising triisobutylaluminum and diisobutylaluminum hydride. After the reaction, the content of the autoclave was cooled to room temperature and the gas was discharged. Thereafter, 2,320 g. of isobutylene was further charged into the autoclave and the content of the autoclave was heated, while stirring, to 70° C. to carry out the reaction for one hour. After the reaction, the autoclave was cooled to room temperature and the gas was discharged to reduced the pressure in the autoclave to atmospheric. Subsequently, the content was withdrawn to recover 194 g. of a metal residue together with triisobutylaluminum. The conversion of aluminum based on the consumed amount of aluminum was 94.8%.

The same procedure as above was repeated, using in place of the aluminum-silicon alloy 270 g. of medium grains of 99.8% purity aluminum of 5–6 mesh. In this case, the conversion of aluminum based on the consumed amount of aluminum was 32.5%.

What we claim is:

1. A method for producing alkylaluminum compounds, which comprises reacting a binary alloy comprising 40–87% by weight of aluminum and 13–60% by weight of silicon with (1) a catalytic substance selected from the group consisting of trialkylaluminum, dialkylaluminum hydride and dialkylaluminum halide, (2) hydrogen, and (3) an aliphatic olefin, at an elevated temperature.

2. A method according to claim 1, wherein said reaction is effected at a temperature between 50° and 200° C.

3. A method according to claim 1, wherein said catalytic substance has alkyl groups of 2 to 20 carbon atoms.

4. A method according to claim 1, wherein said olefin is an α-olefin having 2 to 20 carbon atoms.

5. A method for producing alkylaluminum compounds, which comprises reacting a binary alloy comprising 40–87% by weight of aluminum and 13–60% by weight of silicon with (1) a catalytic substance of trialkylaluminum, and (2) hydrogen, at an elevated temperature.

6. A method according to claim 5, wherein said reaction is effected at a temperature between 50° and 200° C.

7. A method according to claim 5, wherein said trialkylaluminum has alkyl groups of 2 to 20 carbon atoms.

8. A method according to claim 5, wherein said olefin is an α-olefin having 2 to 20 carbon atoms.

References Cited
UNITED STATES PATENTS

| | | | |
|---|---|---|---|
| 3,104,252 | 9/1963 | Radd et al. | 260—448 |
| 3,207,772 | 9/1965 | Ziegler et al. | 260—448 |

FOREIGN PATENTS

| | | |
|---|---|---|
| 857,681 | 1/1961 | Great Britain. |

TOBIAS E. LEVOW, *Primary Examiner.*

H. M. S. SNEED, *Assistant Examiner.*